United States Patent
Asahara et al.

[11] 3,910,796
[45] Oct. 7, 1975

[54] SECONDARY ELECTRON MULTIPLIER GLASS

[75] Inventors: Yoshiyuki Asahara, Kanagawa; Tetsuro Izumitani, Hino, both of Japan

[73] Assignee: Hoya Glass Works, Ltd., Tokyo, Japan

[22] Filed: Mar. 5, 1974

[21] Appl. No.: 448,441

[30] Foreign Application Priority Data
Mar. 5, 1973 Japan.............................. 48-25822

[52] U.S. Cl................. 106/53; 106/50; 106/47 R; 252/519; 252/521; 106/52
[51] Int. Cl.²............................................ C03C 3/00
[58] Field of Search............ 106/47 R, 47 Q, 50, 52, 106/53; 252/518, 515, 519, 521

[56] References Cited
UNITED STATES PATENTS

| | | | |
|---|---|---|---|
| 2,518,194 | 8/1950 | Silverman | 106/47 Q |
| 3,278,317 | 10/1966 | Blair | 106/47 R |
| 3,393,060 | 7/1968 | Blair et al. | 106/47 R |
| 3,503,902 | 3/1970 | Shimoda | 252/518 X |
| 3,520,831 | 7/1970 | Trap | 106/47 R |
| 3,804,645 | 4/1974 | Lewis et al. | 106/50 |

*Primary Examiner*—Patrick P Garvin
*Assistant Examiner*—John F. Niebling
*Attorney, Agent, or Firm*—Sughrue, Rothwell, Mion, Zinn & Macpeak

[57] ABSTRACT

A glass material for producing a secondary electron multiplying tube which comprises, in mol percent, $V_2O_5$ 10 to 45, $WO_3$ 0 to 45, $Fe_2O_3$ 0 to 25, $WO_3$ + $Fe_2O_3$ 15 to 45, BaO 0 to 15, PbO 0 to 15, $P_2O_5$ 30 to 75 and $SiO_2$ 0 to 15.

3 Claims, 2 Drawing Figures

SECONDARY ELECTRON MULTIPLIER GLASS

BACKGROUND OF THE INVENTION

1. Field of the Invention

This invention relates to a glass suitable for a secondary electron multiplier having a secondary electron emission ratio δ of more than 1 and a semiconducting property and capable of formation into tubes and fibers. 2. Description of the Prior Art A channel electron multiplier is produced by forming a material having a secondary electron emission ratio δ of more than 1 into a tube or by arranging a pair of plates of this material in parallel with each other. Examples of channel electron multipliers are disclosed in J. Adams & B. W. Manley: *IEEE Trans Nucl. Sci.* NS-13 (1966) 88, K. C. Schmidt and C. F. Handee: *ibid* NS-13 (1966) 100, C. A. Spindt and K. R. Shoulder: *Rev. Sci. Instrum.*, 36 (1965) 775, J. Dimeff, A. J. Lieber & C. N. Burrows: *ibid*, 37 (1966) 1562 and D. S. Evans: *ibid*, 36 (1965) 375.

When an electric voltage is applied to both ends of the channel electron multiplier, an electron entering one end (inlet end) of the channel collides with the inner wall generating one or more secondary electrons and is accelerated by the applied field towards the other end (outlet end). The multiplication of the secondary electrons is carried out by repeating such collisions. The tube shaped multiplier is a bundle of several hundred thousand extremely slender tubes and formed in a two dimentional plate. This is called the channel plate and is well known to be useful as an image intensifier, for example, as disclosed in J. Adams & B. W. Manley: *Phillips Techn. Rev.*, 28 (1967) 156, W. C. Wiley & C. F. Hendee: *IRE Trans Nucl. Sci.* NS-9 (1962) 103, P. J. Turner et al: *J. Sci. Instrum.*, 2 (1969) 731, W. Parkes, R. Gott & K. A. Pounds: *IEEE Trans Nucl. Sci.* NS-17 [3 ] (1970) 360 and R. Gott, W. Parkes and K. A. Pounds: *ibid NS*-17, [3] (1970) 367 with applications thereof as in *Electronics*, Sept. 27, 1973 p117, *Electro-Optical System Design*, November, 1972 p29, *Advance in Electronics and Electronphysics*, 28A (1969) p471, Academic Press, London and New York. The material used for producing the secondary electron multiplier and the channel plate must have a δ value of more than 1 and must be formed easily into the tube for exhibiting the above multiplying mechanism. Especially, the material for producing the channel plate must be formed easily into a slender tube (See G.A. Chuiko & A. M. Yakobson: *Radio Engineering and Electronic Physics.*, 11 (1966) 1471).

On the other hand, since a channel multiplier exhibiting the above multiplying machanism emits numerous secondary electrons at the outlet end (usually the electron introduced at the inlet end of the channel multiplier results in $10^8$ electrons at the outlet), the inner wall surface near the outlet of the channel is positively charged. Accordingly, the linear property of the multiplied gain is lost and the channel is distorted at the outlet end of the applied voltage (i.e., the voltage for accelerating the electrons). The material for the multiplier must have an electron conducting property and a low electric resistance suitable for forming an electron supplying passage, i.e., a resistivity of less than $10^{12}\Omega$-cm and larger than $10^6 \Omega$cm.

Glass has been utilized for producing the secondary electron multiplying tube since glass is easily formed into a tube or fiber. Ordinary glass, however, exhibits too high a resistivity, i.e., about $10^{15}\Omega$-cm at room temperature, to produce an electron supplying passage. To solve this problem, a glass containing a large amount of PbO was usually heat-treated in a hydrogen gas atmosphere to form a layer of low resistance on the glass surface. This low resistance surface layer, however, is influenced to a great extent by the heat treating conditions; thus a highly accurate technique is required for forming a stable and uniform surface layer of low resistance in the production of the PbO containing glass.

On the other hand, attempts have been made, e.g., as set forth in the above cited and in U.S. Pat. No. 3,520,831, to produce a stable and uniform multiplier tube material having a low resistance by using a semiconductor glass with the intention being to eliminate the above intricate techniques in glass production. However, a glass composition containing oxides of the transition elements, which is well known as a semiconductive glass, exhibits a low electric resistance but is difficult to draw into a tube or fiber. Especially, a glass composition containing $V_2O_5$ exhibits an extremely low electric resistance (about $10^6$ Ω-cm) and is very stable, but exhibits a very low viscosity and can be drawn into a tube or fiber only with extreme difficulty. In addition, a glass containing oxides of other transition elements such as $WO_3$ or $Fe_2O_3$ does not exhibit as low an electric resistance and is unstable, and is also difficult to draw into a tube or fiber.

SUMMARY OF THE INVENTION

This invention is made on a discovery that a glass having a low electric resistance, good stability and a fully high viscosity suitable for drawing into a tube or fiber can be obtained by incorporating $V_2O_5$ and ($WO_3$ and/or $Fe_2O_3$) into the glass. Where the viscosity of the glass is intended to be elevated using compounds other than $WO_3$ and $Fe_2O_3$, the amount of $V_2O_3$ must be duly reduced thereby to reduce the low resistance; that is to say, $WO_3$ and/or $Fe_2O_3$ increases the viscosity and also retains a low resistance.

The secondary electron multiplying glass according to this invention consists, by mol percent, of $V_2O_5$ 10 to 45, $WO_3$ 0 to 45, $Fe_2O_3$ 0 to 25, $WO_3 + Fe_2O_3$ 15 to 45, BaO 0 to 15, PbO 0 to 15, $P_2O_5$ 30 to 75 and $SiO_2$ 0 to 15.

BRIEF DESCRIPTION OF THE ACCOMPANYING DRAWINGS

DETAILED DESCRIPTION OF THE INVENTION

If the amount of $V_2O_5$ is less than 10 percent, the electric resistance of the glass cannot be reduced and the glass becomes unstable in the copresence of $WO_3$ and $Fe_2O_3$. On the other hand, if the $V_2O_5$ amount exceeds 45 percent, the resultant glass shows a low viscosity and cannot be drawn into a tube or fiber. However, the reduction of the $V_2O_5$ content improves the forming property of the glass. It becomes possible when $WO_3$ content is more than 15 mol percent. The following glass composition is preferable: $V_2O_5$ 10 to 29.5 mol percent, $WO_3$ 15 to 25 mol percent, BaO 10 to 15 mol percent, $P_2O_5$ 35 to 50 mol percent, $SiO_2$ 5 to 15 mol percent.

More than 25 percent of $Fe_2O_3$ and more than 45 percent of $WO_3$ cause the glass to be unstable.

If the sum of the $Fe_2O_3$ amount and the $WO_3$ amount is less than 15 percent, the resulting glass exhibits a low melting point, a low viscosity and a high electric resistance.

An amount of less than 30 percent of $P_2O_5$ renders the glass unstable, whereas more than 75 percent of $P_2O_5$ amount increases the electric resistance of the glass due to the relative reduction of the amount of the oxides of the transition elements.

We, the inventors, have also discovered that the viscosity of the $V_2O_5$-($WO_3$, $Fe_2O_3$)-$P_2O_5$ glass can be improved without increasing the electric resistance by introducing thereto BaO and PbO and/or by substituting a part of the $P_2O_5$ with $SiO_2$.

If the amounts of BaO and PbO exceed 15 percent, the amounts of the oxides of the transition elements are reduced and the resulting glass shows a high resistance. When the PbO content is 5 to 15 mol percent, the amount of the $V_2O_5$ can be reduced to 25 mol percent and the forming property of the glass is improved. A glass composition as follows is especially preferable: $V_2O_5$ 15 to 25 mol percent, $WO_3$ 15 to 17 mol percent, BaO 3 to 7 mol percent, PbO 5 to 15 mol percent, $P_2O_5$ 40 to 55 mol percent, $SiO_2$ 0 to 10 mol percent.

If more than 15 percent of $P_2O_5$ is substituted with $SiO_2$, the insoluble $SiO_2$ undesirably exists in the resulting glass.

Figure 1:
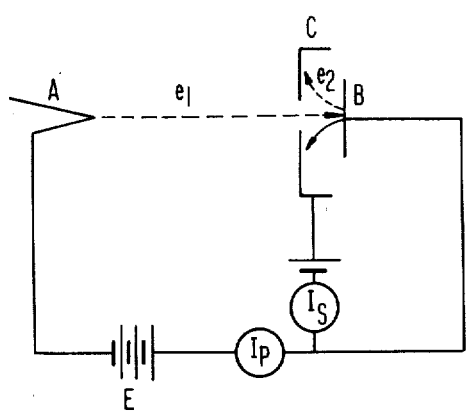
FIG. 1 is a circuit for measuring the secondary electron emitting rate of the glass according to this invention.

Some examples of the glass of this invention will be shown in the following table to illustrate the invention in greater detail.

the applied voltage E which is obtained by the power battery in the circuit for measuring the secondary electron emitting rate in FIG. 1, on the $\delta m$ value, respectively.

In this measuring circuit, A is an emission source of the primary electron e, B is a sample of the glass according to this invention with which the primary electron collides, and C is a collector for the secondary electrons C emitted from the specimen B. By measuring an electric current C emitted from the specimen B. By measuring an electric current Ip caused by the primary electron and an electric current Is caused by the secondary electrons, a secondary electron emitting ratio $\delta(Is/Ip)$ was obtained.

Figure 2:
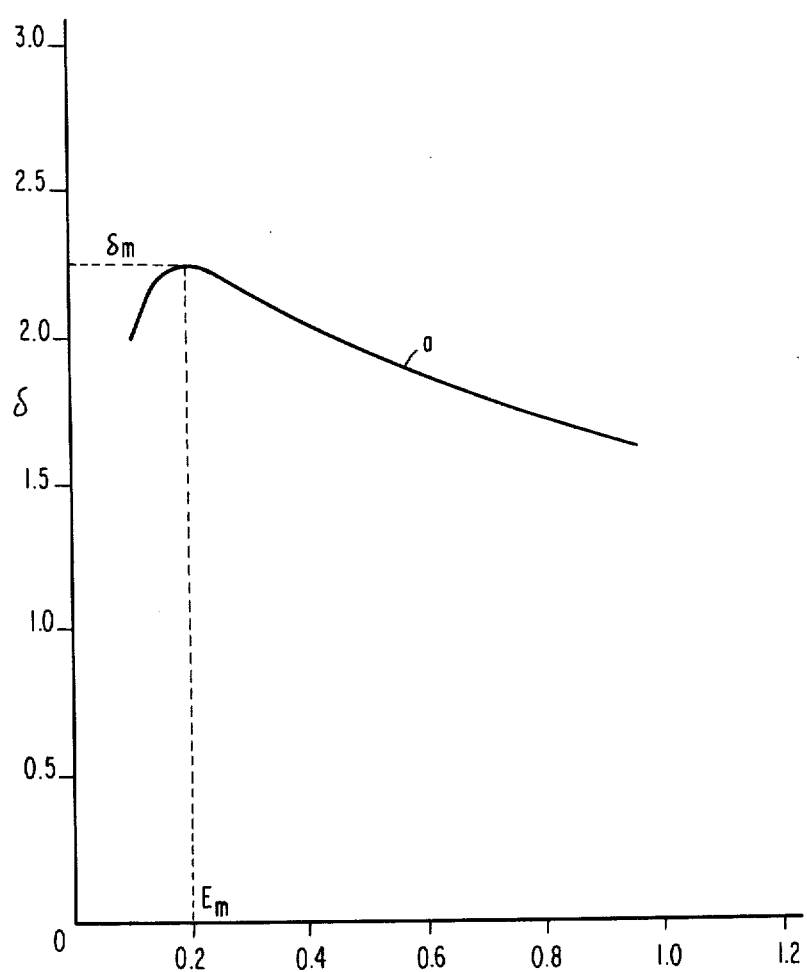
FIG. 2 is a characteristic curve showing the relation between the applied voltage and the secondary electron emitting rate of the glass in Example 2.

Curve (a) in FIG. 2 is an E- characteristic curve for the glass sample in Example 3.

As is particularly described above, the glass according to this invention exhibits a relatively low electric resistance, a $\delta$ value of more than 1, and a favorable property suitable for producing a secondary electron multiplier.

The plasticity and the workability of the glass of this invention were examined by an experiment wherein a glass tube having a diameter of 20 to 40 cm and made from the glass specimen in Example 5 could be drawn into the slender tube having the length of more than 1 m.

The glass of this invention can be produced by mixing the components and melting the glass composition in a clay, silica or alumina crucible at 1,200° to 1,350°C. More particularly, the glass of this invention can be produced by mixing the components, placing the mixture of the glass composition into a clay, silica or alu- Table 1

| No. | Composition (mol%) | | | | | | | Secondary Electron Emitting Rate ($\delta m$) |
|---|---|---|---|---|---|---|---|---|
| | $V_2O_5$ | $WO_3$ | $Fe_2O_3$ | BaO | PbO | $P_2O_5$ | $SiO_2$ | |
| 1 | 30 | — | 20 | — | — | 50 | — | 1.6 |
| 2 | 10 | — | 20 | 8 | — | 62 | — | 1.1 |
| 3 | 20 | 40 | — | 5 | — | 35 | — | 2.25 |
| 4 | 40 | — | 20 | — | — | 50 | — | — |
| 5 | 10.6 | 37.6 | — | 14.2 | — | 37.5 | — | — |
| 6 | 15 | 20 | — | 15 | — | 50 | — | — |
| 7 | 10 | 25 | — | 15 | — | 50 | — | — |
| 8 | 20 | 15 | — | 15 | — | 50 | — | — |
| 9 | 20 | 15 | — | 15 | — | 45 | 5 | — |
| 10 | 20 | 15 | — | 15 | — | 40 | 10 | — |
| 11 | 20 | 15 | — | 15 | — | 35 | — | — |
| 12 | 20 | 15 | — | 5 | 10 | 50 | — | — |

Table 2

| No. | Voltage at Which $\delta m$ Is Obtained Em (V) | Electric Resistance ($\Omega$-cm) | Transition Temperature (°C) | Softening Temperature (°C) |
|---|---|---|---|---|
| 1 | 300 | $7.70 \times 10^6$ | 530 | 560 |
| 2 | — | $4.99 \times 10^{12}$ | — | — |
| 3 | 200 | $2.60 \times 10^7$ | 550 | 592 |
| 4 | — | $9.24 \times 10^6$ | 515 | 550 |
| 5 | — | $9.00 \times 10^6$ | 560 | 600 |
| 6 | — | $2.35 \times 10^6$ | 550 | 600 |
| 7 | — | $2.77 \times 10^{10}$ | — | — |
| 8 | — | — | 532 | 568 |
| 9 | — | — | 532 | 568 |
| 10 | — | — | 540 | 575 |
| 11 | — | $9.65 \times 10^7$ | 515 | 550 |
| 12 | — | — | 498 | 532 |

The $\delta m$ value and the Em value in the Tables show the maximum value $\delta$ of the secondary electron emitting ratio and the maximum value (as shown in FIG. 2) of mina crucible, heating at 1,200° to 1,350°C for about 9 to 10 hours in an air atmosphere, cooling to the transformation temperature Tg and annealing. The cooling process comprises two steps, i.e., a slow cooling in the earlier part of the cooling and a free cooling in air. During the earlier part of the cooling (from 1,200° – 1,350°C to about 900°C), mixing is carried out in order to obtain homogenity. The slow cooling rate is about 100°C/hr. Annealing is carried out by holding the glass near Tg for about 10 to 12 hours, cooling to a temperature of 100°C lower than Tg with the rate of cooling about −5°C/hr, and free cooling in the furnace.

While this invention has been described with reference to specific embodiments thereof, it will be understood that the various changes and modifications can be made by those skilled in the art without departing from the spirit and scope of the invention.

What is claimed is:

1. A glass material for producing a secondary electron multiplying tube which consists, by mol percent, of $V_2O_5$ 10 to 45, $WO_3$ 0 to 45, $Fe_2O_3$ 0 to 25, $WO_3 + Fe_2O_3$ 15 to 45, BaO 0 to 15, PbO 0 to 15, $P_2O_5$ 30 to 75 and $SiO_2$ 0 to 15.

2. The glass material according to claim 1 which consists, by mol percent, of $V_2O_5$ 10 to 29.5, $WO_3$ 15 to 25.0, BaO 10 to 15, $P_2O_5$ 35 to 50 and $SiO_2$ 5 to 15.

3. The glass material according to claim 1 which consists, by mol percent, of $V_2O_5$ 15 to 25, $WO_3$ 15 to 17, BaO 3 to 7, PbO 5 to 15, $P_2O_5$ 50 to 55 and $SiO_2$ 0 and 10.

* * * * *